United States Patent [19]

Prather

[11] 4,376,088
[45] Mar. 8, 1983

[54] PROCESS FOR PREPARING A PARTICLE BOARD USING A SELF-RELEASING BINDER COMPRISING A POLYISOCYANATE AND A SULFUR-CONTAINING RELEASE AGENT

[75] Inventor: Richard A. Prather, Houston, Tex.

[73] Assignee: The Upjohn Company, Kalamazoo, Mich.

[21] Appl. No.: 245,167

[22] Filed: Mar. 18, 1981

[51] Int. Cl.³ .................................................. B29J 5/02
[52] U.S. Cl. ..................................... 264/109; 264/122; 264/300; 528/48
[58] Field of Search .................... 264/122, 109, 300; 528/48

[56] References Cited

U.S. PATENT DOCUMENTS

| | | | |
|---|---|---|---|
| 3,428,592 | 2/1969 | Youker | 260/29.2 |
| 3,440,189 | 4/1969 | Sharp | 260/9 |
| 3,557,263 | 1/1971 | Marra | 264/45 |
| 3,636,199 | 1/1972 | Jenks et al. | 264/134 |
| 3,870,665 | 3/1975 | Diehr et al. | 260/17.2 |
| 3,898,197 | 8/1975 | Gulse et al. | 528/48 X |
| 3,919,017 | 11/1975 | Shoemaker et al. | 156/62.2 |
| 3,930,110 | 12/1975 | Shoemaker et al. | 428/424 |
| 4,220,728 | 9/1980 | Kresta et al. | 528/48 X |
| 4,251,428 | 2/1981 | Recker et al. | 528/48 X |
| 4,257,995 | 3/1981 | McLaughlin et al. | 264/122 |
| 4,257,996 | 3/1981 | Farrissey et al. | 264/122 |
| 4,288,562 | 9/1981 | Kresta et al. | 528/48 X |
| 4,305,858 | 12/1981 | Reiscal | 528/48 X |

*Primary Examiner*—Philip E. Anderson
*Attorney, Agent, or Firm*—Denis A. Firth; John Kekich

[57] ABSTRACT

The use of polyisocyanates as binders in the preparation of particle boards is subject to the drawback that the boards exhibit a tendency to adhere to the face of the platens used in their formation. This problem is minimized by incorporating minor amounts of a mixture of certain organic sulfonic acids, hydrogen sulfates, salts and derivatives thereof, into the polyisocyanate to be used as binder. The polyisocyanates and the sulfonic acids, hydrogen sulfates, salts and derivatives are applied to the particles separately, or after preblending one with the other. Whether the components are applied separately or in combination one with the other, they can each be applied either neat of in the form of an emulsion or emulsions.

12 Claims, No Drawings

PROCESS FOR PREPARING A PARTICLE BOARD USING A SELF-RELEASING BINDER COMPRISING A POLYISOCYANATE AND A SULFUR-CONTAINING RELEASE AGENT

BACKGROUND OF THE INVENTION

1. Field of the Invention

This invention relates to particle board binders and is more particularly concerned with the use of organic polyisocyanates as particle board binders, with compositions for said use, and with the particle boards so prepared.

2. Description of the Prior Art

The use is now widely recognized of organic polyisocyanates, particularly toluene diisocyanate, methylenebis(phenyl isocyanate), and polymethylene polyphenyl polyisocyanates, as binders, or as a component of a binder, for the preparation of particle boards; see, for example, U.S. Patent Nos. 3,428,592; 3,440,189; 3,557,263; 3,636,199; 3,870,665; 3,919,017 and 3,930,110.

In a typical process the binder resins, optionally in the form of a solution or aqueous suspension or emulsion, are applied to or admixed with the particles of cellulosic material, or other types of material capable of forming particle boards, using a tumbler apparatus or blender or other form of agitator. The mixture of particles and binder is then formed into a mat and subjected to heat and pressure using heated platens. The process can be carried out in a batch operation or continuously. To avoid adhesion of the board so formed to the heated platens it has hitherto been necessary to interpose a sheet, impermeable to isocyanate, between the surface of the board and the platen during the forming process, or to coat the surface of the platen, prior to each molding operation, with an appropriate release agent or to coat the surface of the particles themselves with a material which will not adhere to the platen. Any of these alternatives, particularly where the process is being operated on a continuous basis, is cumbersome and a drawback to what is otherwise a very satisfactory method of making a particle board with highly attractive structural strength properties.

We have now found that the above drawbacks to the use of organic isocyanates as particle board binders can be minimized in a very satisfactory manner by incorporating certain organic sulfonic acids, hydrogen sulfates, salts or derivatives thereof as internal release agents in the isocyanate compositions so utilized.

Copending applications Ser. Nos. 134,315, filed Mar. 26, 1980 and now U.S. Pat. No. 4,257,995 and 139,872 filed and Apr. 14, 1980, and now U.S. Pat. No. 4,257,996, describe the use of certain phosphorus containing compounds for the same purpose.

SUMMARY OF THE INVENTION

This invention comprises an improved process for the preparation of particle board in which particles of organic material capable of being compacted are contacted with a polyisocyanate and the treated particles are subsequently formed into boards by the application of heat and pressure, wherein the improvement comprises contacting said particles, in addition to the treatment with polyisocyanate, with from about 0.1 to 20 parts, per 100 parts by weight of polyisocyanate, of a compound selected from the class consisting of (a) organic mono- and poly-sulfonic acids of the formulae:

$$R-SO_3H \text{ and } R'-(SO_3H)_n \quad \text{(I)(II)}$$

wherein n is an integer having a value of at least 2.

(b) organic sulfonic acid anhydrides of the formula:

$$R_1-SO_2-O-SO_2-R_2 \quad \text{(III)}$$

(c) N,N-disubstituted taurates of the formula:

$$\underset{R_3}{\overset{O}{\underset{\|}{RC}}-N-CH_2-CH_2-SO_3H} \quad \text{(IV)}$$

(d) sulfo esters of the formula:

$$\overset{O}{\underset{\|}{RC}}-O-CH_2CH_2SO_3H \quad \text{(V)}$$

(e) organic hydrogen sulfates of the formula:

$$RO-SO_3H \quad \text{(VI)}$$

(f) alkanolamido alkane sulfate esters of the formula:

$$\overset{O}{\underset{\|}{RC}}-N\overset{R_4}{\underset{CH_2CH_2OSO_3H}{\diagdown}} \quad \text{(VII)}$$

and (g) alkali metal, alkaline earth metal, and heavy metal salts of the acids of formulae (I), (II), (IV), (V), (VI) and (VII);

wherein, in the above formulae, R, $R_1$ and $R_2$ each independently represent alkyl having at least 6 carbon atoms, alkenyl having at least 6 carbon atoms, alkenyl substituted by carboxy and having at least 4 carbon atoms, alkyl as above defined and substituted by from 1 to 2 acyloxy groups wherein the acyl group is the residue of an aliphatic monocarboxylic acid having at least 2 carbon atoms, aryl, aryl substituted by at least one alkyl, and $$R''-(O-\underset{A}{\overset{|}{CH}}-\underset{B}{\overset{|}{CH}})_m-$$

wherein R″ is selected from the class consisting of alkyl, aryl and aryl substituted by at least one alkyl, one of A and B represents hydrogen and the other is selected from the class consisting of hydrogen, methyl, chloromethyl and 2,2,2-trichloromethyl, and m is a number having an average value from 1 to 25; $R_3$ is selected from the class consisting of methyl and ethyl; $R_4$ is selected from the class consisting of hydrogen and $-CH_2CH_2OSO_3H$; and R′ corresponds to the radical R having n-1 additional $SO_3H$ groups substituted therein.

The invention also comprises novel compositions comprising organic polyisocyanates having incorporated therein one or more of the aforesaid compounds.

The invention also comprises particle board prepared in accordance with the aforesaid process.

The term "alkyl having at least 6 carbon atoms" means a saturated monovalent aliphatic radical, straight chain or branched chain, which has the stated minimum number of carbon atoms in the molecule. Illustrative of such groups are hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, pentacosyl, hexacosyl, heptacosyl, octacosyl, nonacosyl, triacontyl, pentatriacontyl, and the like, including isomeric forms thereof.

The term "alkenyl having at least 6 carbon atoms" means a monovalent straight or branched chain aliphatic radical containing at least one double bond, and having the stated minimum number of carbon atoms in the molecule. Illustrative of such groups are hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, pentacosenyl, triacontenyl, pentatriacontenyl, and the like, including isomeric forms thereof.

The term "carboxyalkenyl having at least 4 carbon atoms" means alkenyl as above defined which carries at least one free or esterified carboxy group as substituent.

The term "aryl" means the monovalent radical obtained by removing one nuclear hydrogen atom from an aromatic hydrocarbon. Illustrative of aryl are phenyl, naphthyl, biphenylyl, triphenylyl and the like. The term "aryl substituted by alkyl" means an aryl radical, as above defined, carrying at least one alkyl as defined immediately below.

The term "alkyl" without a carbon atom limitation which is employed to define the parameter R' is inclusive of the examples of alkyl set forth above as well as alkyl having from 1 to 5 carbon atoms such as methyl, ethyl, propyl, butyl, and pentyl including isomeric forms thereof.

Illustrative of aliphatic carboxylic acids having at least 2 carbon atoms are acetic, propionic, butyric, hexanoic, heptanoic, octanoic and like acids including isomeric forms thereof.

Each of the groups R, $R_1$, $R_2$ and R' in the formulae set forth above can optionally be substituted by one or more inert substituents, i.e. substituents which do not contain active hydrogen atoms and which are therefore unreactive in the presence of the polyisocyanate. Illustrative of such inert substituents are alkoxy, alkylmercapto, alkenyloxy, alkenylmercapto, aryloxy, chloro, bromo, iodo, fluoro, cyano and the like.

The term "alkali metal" has its well recognized meaning as being inclusive of lithium, sodium, potassium, rubidium and caesium. The term "alkaline earth metal" also has its well recognized meaning as being inclusive of calcium, strontium, magnesium and barium. The term "heavy metal" is inclusive of vanadium, chromium, manganese, iron, cobalt, nickel, copper, zinc, and the like.

DETAILED DESCRIPTION OF THE INVENTION

The process of the invention is carried out substantially in accordance with methods previously described in the art in which an organic polyisocyanate is used as the binder resin, or a component thereof, (see, for example, German Offenlegungsschrift No. 2610552 and U.S. Pat. No. 3,428,592) with the chief exception that a sulfur-containing release agent of the class defined hereinbefore is employed in combination with the isocyanate composition which is used to treat the particles which are to be bonded together to form the particle board.

Thus, particle board is produced according to the invention by bonding together particles of wood or other cellulosic or organic or inorganic material capable of being compacted using heat and pressure in the presence of a binder system which comprises a combination of an organic polyisocyanate and a sulfur-containing release agent of the class hereinbefore defined, hereinafter referred to collectively as the "release agent."

The polyisocyanate and the release agent can be brought into contact with the particles as separate, individual components or, in a preferred embodiment, the polyisocyanate and release agent are brought into contact with the particles either simultaneously or after admixture. Whether the polyisocyanate and release agent are introduced separately or in admixture, they can be employed neat, i.e. without diluents or solvents, or one or other or both can be employed in the form of aqueous dispersions or emulsions.

The polyisocyanate component of the binder system can be any organic polyisocyanate which contains at least two isocyanate groups per molecule. Illustrative of organic polyisocyanates are diphenylmethane diisocyanate, m- and p-phenylene diisocyanates, chlorophenylene diisocyanate, α,α-xylylene diisocyanate, 2,4- and 2,6-toluene diisocyanate and the mixtures of these two isomers which are available commercially, triphenylmethane triisocyanates, 4,4'-diisocyanatodiphenyl ether, and polymethylene polyphenyl polyisocyanates. The latter polyisocyanates are mixtures containing from about 25 to about 90 percent by weight of methylenebis(phenyl isocyanate) the remainder of the mixture being polymethylene polyphenyl polyisocyanates of functionality higher than 2.0. Such polyisocyanates and methods for their preparation are well-known in the art; see, for example, U.S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

The polymethylene polyphenyl polyisocyanates are the preferred polyisocyanates for use in the binder systems of the invention. Particularly preferred polymethylene polyphenyl polyisocyanates are those which contain from about 35 to about 65 percent by weight of methylenebis(phenyl isocyanate).

When the organic polyisocyanate is to be employed as binder system in the form of an aqueous emulsion or dispersion in accordance with the invention, the aqueous emulsion or dispersion can be prepared using any of the techniques known in the art for the preparation of aqueous emulsions or dispersions, prior to use of the composition as the binder. Illustratively, the polyisocyanate is dispersed in water in the presence of an emulsifying agent. The latter can be any of the emulsifying agents known in the art including anionic and nonionic agents. Illustrative of nonionic emulsifying agents are polyoxyethylene and polyoxypropylene alcohols and block copolymers of two or more of ethylene oxide, propylene oxide, butylene oxide, and styrene; alkoxylated alkylphenols such as nonylphenoxy poly(ethyleneoxy)ethanols; alkoxylated aliphatic alcohols such as ethoxylated and propoxylated aliphatic alcohols containing from about 4 to 18 carbon atoms; glycerides of saturated and unsaturated fatty acids such as stearic, oleic, and ricinoleic acids and the like; polyoxyalkylene esters of fatty acids such as stearic, lauric, oleic and like acids; fatty acid amides such as the dialkanolamides of fatty acids such as stearic, lauric, oleic and like acids. A detailed account of such materials is found in Encyclopedia of Chemical Technology, Second Edition, Vol. 19, pp. 531-554, 1969, Interscience Publishers, New York.

Many of the release agents employed in the present invention possess surfactant properties and, accordingly, when the polysiocyanate and release agent are blended together prior to use the release agent may also act as dispersing agent when the blend is applied as an aqueous dispersion. It may therefore not be necessary in some cases to employ an additional dispersing or emulsifying agent when the polyisocyanate is to be dispersed in water.

The formation of the above emulsion or dispersion can be carried out at any time prior to its use as the binder composition, but, preferably, it is carried out within about 3 hours prior to use. Any of the methods conventional in the art for the preparation of aqueous emulsions can be employed in preparing the aqueous polyisocyanate emulsions employed in the process of the invention. Illustratively, the emulsion is formed by bringing the polyisocyanate, emulsifying agent (which may also be the release agent as discussed above) and water together under pressure using a conventional spray gun in which the streams of water and polyisocyanate impinge and are mixed under turbulent conditions in the mixing chamber of the spray gun. The emulsion so formed is discharged in the form of a spray which is applied to the cellulosic particles to be formed into boardstock in the manner discussed below.

As discussed above, the release agent can be brought into contact with the particles as a separate component in which case it is employed in neat form, i.e. without diluents, or as an aqueous solution or dispersion. Preferably the release agent, either neat or in diluted form when used alone, i.e. separately from the polyisocyanate, is presented to the particles in the form of a spray. However, in a preferred embodiment of the invention the release agent and the polyisocyanate are employed together in a single composition. This can be accomplished in several ways. Thus, when the polyisocyanate is employed as binder resin without diluents such as water, the release agent can be incorporated in the polyisocyanate by simple admixture. Where the polyisocyanate is employed as binder resin in the form of an aqueous emulsion the release agent can be added as a separate component during the formation of the emulsion or after its formation or, in a particularly advantageous embodiment, the release agent is premixed with the organic polyisocyanate prior to emulsification of the latter. Thus, the organic polyisocyanate and the release agent can be premixed and stored for any desired period prior to formation of the emulsion. Further, when an emulsifying agent is employed, in addition to the release agent, in preparation of the emulsion said emulsifying agent can also be incorporated into the mixture of organic polyisocyanate and release agent to form a storage stable composition which can be converted, at any desired time, to an aqueous emulsion for use as a binder resin by simple admixture with water.

When the polyisocyanate is employed as binder in the form of an aqueous emulsion, the proportion of organic polyisocyanate present in the said aqueous emulsion is advantageously within the range of about 0.1 to about 99 percent by weight and preferably within the range of about 25 to about 75 percent by weight.

Whether the release agent is introduced as a separate component or in combination with the polyisocyanate, the proportion of release agent employed is within the range of about 0.1 to about 20 parts by weight, per 100 parts of polyisocyanate and, preferably, is within the range of about 2 to about 10 parts by weight, per 100 parts of polyisocyanate. The proportion of emulsifying agent, if any, required to prepare the aqueous emulsion is not critical and varies according to the particular emulsifying agent employed but is generally within the range of about 0.1 to about 20 percent by weight based on polyisocyanate.

The starting material for the particle board comprises particles of cellulosic and like material capable of being compacted and bonded into the form of boards. Typical such materials are wood particles derived from lumber manufacturing waste such as planar shavings, veneer chips, and the like. Particles of other cellulosic material such as shredded paper, pulp or vegetable fibres such as corn stalks, straw, bagasse and the like, and of non-cellulosic materials such as scrap polyurethane, polyisocyanurate and like polymer foams can also be used. Inorganic materials such as hydrated alumina, gypsum, chopped mineral fibres and the like can also be employed, either alone or in combination with any of the above cellulosic or non-cellulosic materials, in the formation of particle boards in accordance with the present invention. If desired, mixtures of cellulosic particles may be used. Particle board has been successfully produced, for example, from wood particle mixtures containing up to about 30% bark.

The moisture content of the particles suitably may range from about 0 to about 24 percent by weight. Typically, particles made from lumber waste materials contain about 10-20% moisture, and may be used without first being dried.

Particle board is fabricated by spraying the particles with the components of the binder composition, either separately or in combination, while the particles are tumbled or agitated in a blender or like mixing apparatus. Illustratively, a total of about 2 to 8% by weight of the binder system (excluding any water present therein) is added, based on the "bone dry" weight of the particles, but higher or lower amounts of binder resin may be used in any given application. Illustratively, where the particles are of large size, such as in chipboard and wafer board, it is possible to use amounts of binder as low as 1% by weight or even less based on the "bone dry" weight of the particles. Where the particles are very small, i.e. have a high surface area to volume ratio as in the case of powdered inorganic materials, it is desirable to use amounts of binder as high as about 20 percent by weight or even higher. If desired, other materials, such as wax sizing agents, fire retardants, pigments and the like, may also be added to the particles during the blending step.

After blending sufficiently to produce a uniform mixture, the coated particles are formed into a loose mat or felt, preferably containing between about 4% and about 18% moisture by weight. The mat is then placed in a heated press between caul plates and compressed to consolidate the particles into a board. Pressing times, temperatures and pressures vary widely depending on the thickness of the board produced, the desired density of the board, the size of the particles used, and other factors well known in the art. By way of example, however, for ½" thick particle board of medium density, pressures of about 300 to 700 psi and temperatures of about 325°–375° F. are typical. Pressing times are typically about 2–5 minutes. Because a portion of the moisture present in the mat reacts with polyisocyanate to form polyurea, as described earlier, the level of moisture present in the mat is not as critical with isocyanate binders as with other binder systems.

The above-described process can be carried out on a batch basis, i.e. individual sheets of particle board can be molded by treating an appropriate amount of particles with the binder resin combination and heating and pressing the treated material. Alternatively, the process can be carried out in a continuous manner by feeding treated particles in the form of a continuous web or mat through a heating and pressing zone defined by upper and lower continuous steel belts to which, and through which, the necessary heat and pressure are applied.

Whether the process of the invention is carried out in a batchwise or continuous manner, it is found that the particle board produced using the polyisocyanate and release agent combination of the invention is released readily from the metal plates of the press used in its formation and shows no tendency to stick or adhere to said plates. This is in direct contrast to previous experience with the use of polyisocyanates alone as binder resins as discussed above.

The various compounds which are employed as release agents in accordance with the invention are, for the most part, known compounds which can be prepared by methods conventional in the art. Illustratively, the methods of preparation of the various types of compound are reviewed in detail in the Encyclopedia of Chemical Technology, Second Edition, Kirk-Othmer, Interscience, New York 1969, Vol. 19, pp 279–310, which disclosure is incorporated herein by reference. The alkali metal, alkaline earth metal, and heavy metal salts of acids of formulae (I), (II), (IV), (V), (VI) and (VII) are readily obtained from the appropriate acid by conventional salt-forming procedures.

Illustrative of the compounds (I) and (VI) are decyl-, undecyl-, dodecyl-, tridecyl-, tetradecyl-, pentadecyl-, hexadecyl-, heptadecyl-, octadecyl-, nonadecyl-, eicosyl-, heneicosyl-, docosyl-, tricosyl-, pentacosyl-, hexacosyl-, heptacosyl-, octacosyl-, nonacosyl-, triacontyl-, octacosyl-, nonacosyl-, triacontyl-, pentatriacontyl-, decenyl-, dodecenyl-, tridecenyl-, tetradecenyl-, pentadecenyl-, hexadecenyl-, heptadecenyl-, octadecenyl-, nonadecenyl-, eicosenyl-, heneicosenyl-, docosenyl-, tricosenyl-, pentacosenyl-, triacontenyl-, pentatriacosenyl-, decylbenzene-, dodecylbenzene-, hexadecylbenzene-, octadecylbenzene-, docosylbenzene-, and phenoxybenzene-sulfonic acids; sulfonated castor oil; decyl, undecyl, dodecyl, tridecyl, tetradecyl, pentadecyl, hexadecyl, heptadecyl, octadecyl, nonadecyl, eicosyl, heneicosyl, docosyl, tricosyl, pentacosyl, hexacosyl, heptacosyl, octacosyl, nonacosyl, triacontyl, octacosyl, nonacosyl, triacontyl, pentatriacontyl, decenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, pentacosenyl, triacontenyl, pentatriacosenyl, decylphenyl, dodecylphenyl, hexadecylphenyl, octadecylphenyl and docosylphenyl hydrogen sulfates; hydrogen sulfates of alkoxylated aliphatic alcohols such as ethoxylated lauryl alcohol; and the sodium, potassium and like alkali metal and alkaline earth metal salts of said sulfonic acids and hydrogen sulfates.

The sulfonic acid anhydrides of formula (III) are derived from the corresponding sulfonic acids (I) by reaction with thionyl chloride; see Meyer et al., Monatsh. 34, 569, 1913; ibid 36, 721, 1915. Illustrative of such anhydrides are those obtained from the sulfonic acids (I) exemplified above as well as those obtained from a mixture of any two of said acids.

Illustrative of the N,N-disubstituted taurines of formula (IV) are:

N-methyl-N-lauroyl-, N-ethyl-N-lauroyl-, N-methyl-N-oleoyl-, N-methyl-N-stearoyl-, N-methyl-N-nonanoyl-, N-methyl-N-undecanoyl-, N-methyl-N-tridecanoyl-, N-methyl-N-palmitoyl-taurine and the sodium and potassium salts thereof.

Illustrative of the sulfo esters of formula (V) (which compounds are esters of isethionic acid with carboxylic acids) are lauroyl-, stearoyl-, oleoyl- and dodecylbenzoylisethionic acids in the form of their sodium and potassium salts.

Illustrative of alkanolamido-alkane hydrogen sulfates of formula (VII) are the sulfate esters of lauric mono- and diethanolamide, stearic mono- and diethanolamide, oleic mono- and diethanolamide, palmitic mono- and diethanolamide and the sodium and potassium salts thereof.

In a further embodiment of the invention it is found that the combination of polyisocyanate and release agent employed as binder in the process of the invention can be used in conjunction with thermosetting resin binders hitherto employed in the art such as phenol-formaldehyde, resorcinol-formaldehyde, melamine-formaldehyde, urea-formaldehyde, urea-furfural and condensed furfuryl alcohol series. Not only does the use of such a combination avoid the problems of adhesion of the finished particle boards to the platens of the press, which problems were previously encountered with a blend of isocyanate and the above type of thermosetting resin binder, but the physical properties of the particle boards so obtained are markedly improved by the use of the combination.

The following examples describe the manner and process of making and using the invention and set forth the best mode contemplated by the inventors of carrying out the invention but are not to be construed as limiting.

EXAMPLE 1

A wood particle board was prepared using the following procedure:

A batch of 2500 g. of Douglas fir wood chips was sprayed with a blend of 112 g. of polymethylene polyphenyl polyisocyanate (equivalent wt.=135; viscosity=ca 180 cps. at 25° C.; functionality 2.6) and 12.3 g. of undecylbenzenesulfonic acid (Sulframin 1298; Witco). The spraying operation was accomplished by placing the wood chips in a rotating blender drum and rotating the drum while applying the blend of polyisocyanate and undecylbenzenesulfonic acid to the tumbling chips with a standard spray tip system. The chips were tumbled for a further 2 minutes after application of the spray. An aliquot (2156 g.) of the treated chips was utilized to prepare a particle board by forming the chips into a felted mat on an aluminum foil sheet supported on a cold-rolled steel plate (24"×36"×⅛"). A plywood forming frame (18.5"×30") was used to prepare the felted mat. The frame was removed after the mat was prepared. Steel bars having a thickness of ⅜" were placed along the two shorter opposing edges of the lower platen mat. A sheet of aluminum foil and a second steel plate (24"×36"×150") were then placed on top of the mat. The complete assembly was then placed on the lower platen of a Ludlum press having a capacity of 456,000 lbs. of force. Both platens of the press were preheated to 350° F. Pressure was applied to the assembly until a force of 500 psi was attained and this was maintained for 2.5 minutes. At the end of this period the pressure was released and the particle board, with the aluminum foil still in contact, was removed from the press. It was found that the finished particle board separated from the aluminum foil sheets readily without any resistance or evidence of sticking.

EXAMPLE 2

A series of particle boards was prepared using different release agents in accordance with the invention and employing the same procedure as that described in Example 1 with the sole exception that the polyisocyanate and the release agent were applied separately to the wood chips rather than being preblended and applied together. The release agent was applied neat or in a solution of water or organic solvent. The nature and amount of the release agent and the amount of water or solvent, if any, used to dissolve the latter are set forth in Table I. The latter also records the relative ease with which the aluminum foil sheets separated from the finished particle board in accordance with the following rating system. "Excellent" indicates no resistance to removal, "good" indicates no resistance to removal manually and "fair" means some resistance but the sheets could be peeled off without tearing or other damage to the foil. It will be seen that all the release agents tested showed good release properties.

TABLE I

| Release Agent | Wt. of Agent (g.) | Wt. of Water (g.) | Organic Solvent[1] (ml.) | Ease of Release |
|---|---|---|---|---|
| Sodium decylsulfonate | 5.4 | — | 100 | Excellent |
| Sulfonated Castor Oil[2] | 14 | — | — | Excellent |
| Alpha olefin (C14–C16) sulfonic acid[3] | 7.5 | — | 50 | Excellent |
| Sodium dodecylbenzenesulfonate | 6.5 | 150 | — | Fair |
| Undecylbenzenesulfonic acid | 7 | — | 50 | Good |
| Sodium decyl sulfate | 4.95 | 75 | — | Good |
| Sodium lauryl sulfate | 6.5 | 50 | — | Good |
| Acid sulfate (sodium salt) of ethoxylated decyl alcohol[4] | 6 | — | 50 | Good |
| Acid sulfate of ethoxylated decyl alcohol[5] | 12 | — | 50 | Excellent |
| decylphenoxybenzenedisulfonic acid; disodium salt[6] | 11.5 | 50 | — | Excellent |
| decylphenoxybenzenedisulfonic acid; disodium salt[7] | 11.5 | 50 | — | Excellent |

Footnotes:
[1]Mixture of approximately equal parts of methylene chloride, acetone and methyl ethyl ketone.
[2]50% aqueous solution
[3]Sulframin 14–16 AOS; Witco Chemical
[4]Witcolate 1259: Witco Chemical
[5]Ultrasulfate SE-5: Witco Chemical
[6]Dowfax 2AO: Dow Chemical (40% active ingredient)
[7]Dowfax 2A1: Dow Chemical (45% active ingredient)

I claim:
1. In a process for the preparation of particle board wherein particles of material capable of being compacted are contacted with a polyisocyanate and the treated particles are subsequently formed into boards by the application of heat and pressure, the improvement which comprises imparting self-releasing properties to said particle board by contacting said particles, in addition to the treatment with said polyisocyanate, with from about 0.1 to about 20 parts, per 100 parts by weight of said polyisocyanate, of a sulfur-containing compound selected from the group consisting of
(a) organic mono- and poly-sulfonic acids of the formulae:

$$R-SO_3H \text{ and } R'-(SO_3H)_n \quad \text{(I)(II)}$$

wherein n is an integer having a value of at least 2,
(b) organic sulfonic acid anhydrides of the formula:

$$R_1-SO_2-O-SO_2-R_2 \quad \text{(III)}$$

(c) N,N-disubstituted taurates of the formula:

$$\underset{R_3}{\underset{|}{RC}}\overset{O}{\overset{\|}{-}}N-CH_2-CH_2-SO_3H \quad \text{(IV)}$$

(d) sulfo esters of the formula:

$$R\overset{O}{\overset{\|}{C}}-O-CH_2CH_2SO_3H \quad \text{(V)}$$

(e) organic hydrogen sulfates of the formula:

$$RO-SO_3H \quad \text{(VI)}$$

(f) alkanolamido alkane sulfate esters of the formula:

$$R\overset{O}{\overset{\|}{C}}-N\overset{R_4}{\underset{CH_2CH_2OSO_3H}{\diagup}} \quad \text{(VII)}$$

and
(g) alkali metal, alkaline earth metal, and heavy metal salts of the acids of formulae (I), (II), (IV), (V), (VI) and (VII);
wherein, in the above formulae, R, R₁ and R₂ each independently represent alkyl having at least 6 carbon atoms, alkenyl having at least 6 carbon atoms, alkenyl substituted by carboxy and having at least 4 carbon atoms, alkyl as above defined and substituted by from 1 to 2 acyloxy groups wherein the acyl group is the residue of an aliphatic monocarboxylic acid having at least 2 carbon atoms, aryl, aryl substituted by at least one alkyl, and

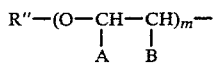

wherein R″ is selected from the class consisting of alkyl, aryl and aryl substituted by at least one alkyl, one of A and B represents hydrogen and the other is selected from the class consisting of hydrogen, methyl, chloromethyl and 2,2,2-trichloromethyl, and m is a number having an average value from 1 to 25; $R_3$ is selected from the class consisting of methyl and ethyl; $R_4$ is selected from the class consisting of hydrogen and $—CH_2CH_2OSO_3H$; and R′ corresponds to the radical R having n-1 additional $SO_3H$ groups substituted therein.

2. The process of claim 1 wherein said polyisocyanate is a polymethylene polyphenyl polyisocyanate containing from about 25 to about 90 percent by weight of methylenebis(phenyl isocyanate), the remainder of said mixture being oligomeric polymethylene polyphenyl polyisocyanates of functionality greater than 2.

3. The process of claim 2 wherein the polymethylene polyphenyl polyisocyanate contains from about 35 to about 65 percent by weight of methylenebis(phenyl isocyanate).

4. The process of claim 1 wherein said compound is selected from the group consisting of decylsulfonic acid and the sodium salt thereof.

5. The process of claim 1 wherein said compound is sulfonated castor oil.

6. The process of claim 1 wherein said compound is selected from the group consisting of dodecylbenzenesulfonic acid and the sodium salt thereof.

7. The process of claim 1 wherein said compound is selected from the group consisting of undecylbenzenesulfonic acid and the sodium salt thereof.

8. The process of claim 1 wherein said compound is selected from the group consisting of decyl hydrogen sulfate and the sodium salt thereof.

9. The process of claim 1 wherein said compound is selected from the group consisting of dodecyl hydrogen sulfate and the sodium salt thereof.

10. The process of claim 1 wherein the particles employed in the preparation of said particle board are wood chips.

11. The process of claim 1 wherein said polyisocyanate and said compound (I) or (II) or the salts thereof are applied simultaneously to said particles in the form of an aqueous emulsion.

12. The process of claim 1 wherein said particles are contacted separately with said polyisocyanate and said sulfur-containing compound.

* * * * *

UNITED STATES PATENT OFFICE
CERTIFICATE OF CORRECTION

Patent No. 4,376,088　　　　　　　　Dated March 8, 1983

Inventor(s) Richard A. Prather

It is certified that error appears in the above-identified patent and that said Letters Patent are hereby corrected as shown below:

Column 9, line 10 "(24" x 36" x 150")" should read --(24" x 36" x 1/8")--. In column 2, lines 4-6 and column 10, lines 30-32 the numerals "(I)" and "(II)" should be immediately under the formulae R-SO$_3$H and R'-(SO$_3$H)$_n$, respectively.

Signed and Sealed this

Nineteenth Day of July 1983

[SEAL]

Attest:

GERALD J. MOSSINGHOFF

Attesting Officer　　Commissioner of Patents and Trademarks